US009965229B2

(12) United States Patent
Ding et al.

(10) Patent No.: US 9,965,229 B2
(45) Date of Patent: *May 8, 2018

(54) LOCKED PRINT IN CLOUD PRINTING ENVIRONMENTS

(71) Applicants: Yi Ding, Saratoga, CA (US); Tetsuro Motoyama, Cupertino, CA (US)

(72) Inventors: Yi Ding, Saratoga, CA (US); Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/041,279

(22) Filed: Feb. 11, 2016

(65) Prior Publication Data
US 2016/0162225 A1 Jun. 9, 2016

Related U.S. Application Data

(63) Continuation of application No. 14/194,573, filed on Feb. 28, 2014, now Pat. No. 9,292,236.

(51) Int. Cl.
G06F 3/12 (2006.01)
H04N 1/00 (2006.01)

(52) U.S. Cl.
CPC .......... G06F 3/1222 (2013.01); G06F 3/1207 (2013.01); G06F 3/1237 (2013.01); G06F 3/1238 (2013.01); G06F 3/1267 (2013.01); G06F 3/1287 (2013.01); G06F 3/1288 (2013.01); H04N 1/00411 (2013.01); H04N 2201/0094 (2013.01)

(58) Field of Classification Search
None
See application file for complete search history.

(56) References Cited

U.S. PATENT DOCUMENTS

2004/0263870 A1 12/2004 Itoh et al.
2006/0279599 A1 12/2006 Kim
(Continued)

FOREIGN PATENT DOCUMENTS

EP 1621 994 A1 2/2006

OTHER PUBLICATIONS

U.S. Appl. No. 14/194,573, filed Feb. 28, 2014, Office Action, dated Oct. 29, 2014.

(Continued)

Primary Examiner — Helen Zong
(74) Attorney, Agent, or Firm — Hickman Palermo Becker Bingham LLP; Edward A. Becker

(57) ABSTRACT

An approach is provided for managing locked printing requests in cloud printing environments. In a cloud printing environment, a cloud printing service provider provides a platform that enables client devices to send print requests for processing by any printing device that is configured to communicate with the cloud printing service provider over a network, such as the Internet. A printing device comprises a cloud print agent that is configured to manage locked printing requests received from client devices via a cloud printing platform. The cloud print agent may be further configured to notify a user when print job data for a print job submitted by the user is approaching expiration.

20 Claims, 10 Drawing Sheets

(56) References Cited

U.S. PATENT DOCUMENTS

| | | | |
|---|---|---|---|
| 2008/0259380 A1* | 10/2008 | Nuggehalli | G06F 21/608 358/1.15 |
| 2010/0002249 A1* | 1/2010 | Nuggehalli | G06F 21/554 358/1.14 |
| 2010/0177340 A1* | 7/2010 | Huster | H04L 67/125 358/1.15 |
| 2010/0182630 A1 | 7/2010 | Jethani et al. | |
| 2011/0170131 A1 | 7/2011 | Kondo | |
| 2013/0235418 A1 | 9/2013 | Tanaka | |
| 2013/0321857 A1 | 12/2013 | Asay et al. | |
| 2014/0146343 A1* | 5/2014 | Matsumura | G06F 3/1219 358/1.14 |
| 2014/0198340 A1 | 7/2014 | Bailey | |
| 2014/0313539 A1* | 10/2014 | Kawano | G06F 21/44 358/1.14 |
| 2015/0248258 A1 | 9/2015 | Ding | |

OTHER PUBLICATIONS

U.S. Appl. No. 14/194,573, filed Feb. 28, 2014, Office Action, dated Jun. 26, 2015.
U.S. Appl. No. 14/194,573, filed Feb. 28, 2014, Notice of Allowance, dated Dec. 23, 2015.
U.S. Appl. No. 14/194,573, filed Feb. 28, 2014, Final Office Action, dated Jan. 22, 2015.
U.S. Appl. No. 14/194,573, filed Feb. 28, 2014, Advisory Action, dated May 11, 2015.
European Patent Office, "Search Report" in application No. 15155204.9-1957, dated Aug. 4, 2015, 7 pages.

\* cited by examiner

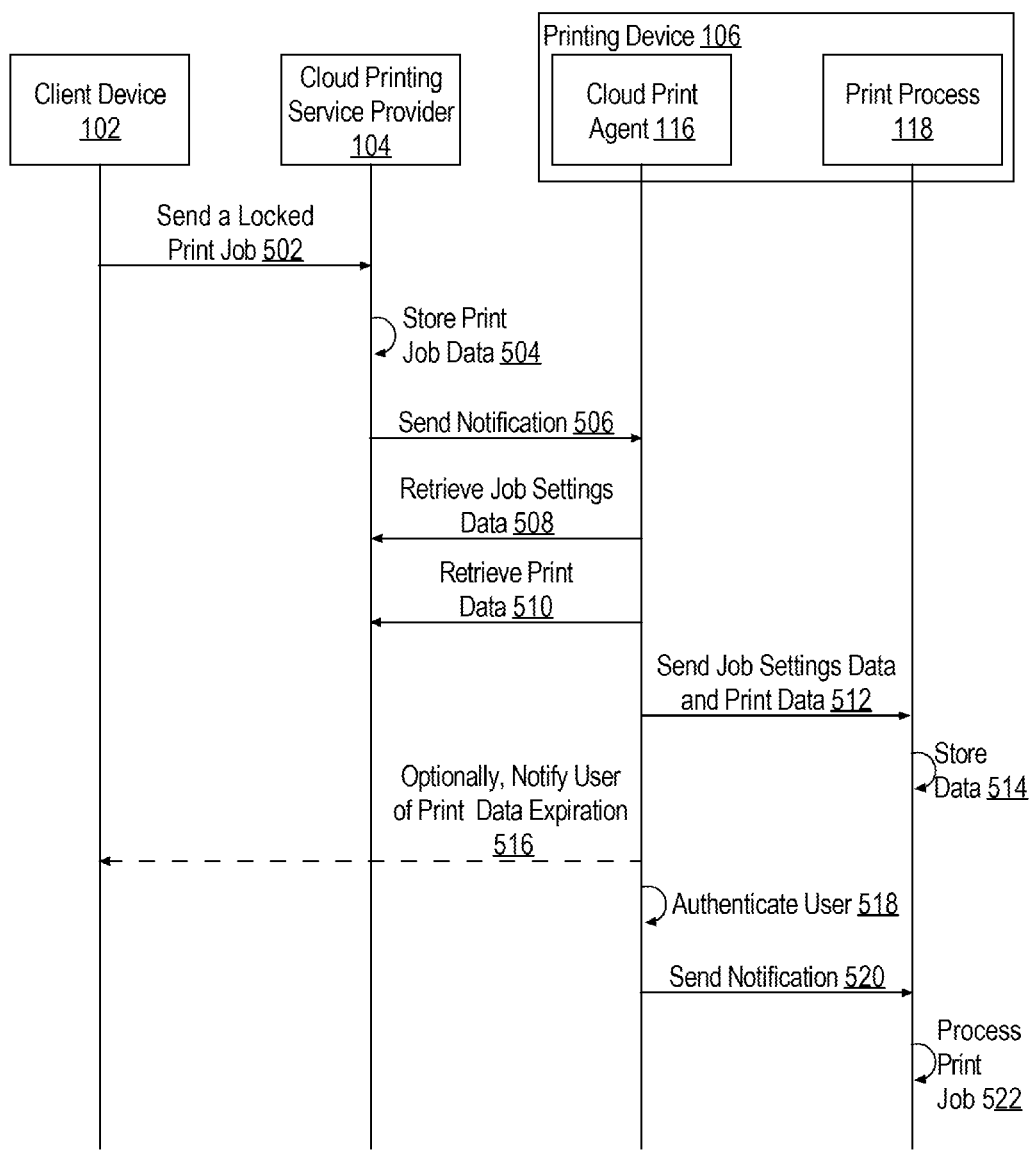

LOCKED PRINT IN CLOUD PRINTING ENVIRONMENTS

RELATED APPLICATION DATA AND CLAIM OF PRIORITY

This application is a Continuation of prior U.S. patent application Ser. No. 14/194,573 entitled "Locked Print In Cloud Printing Environments", filed Feb. 28, 2014, the contents of which are incorporated by reference for all purposes as if fully set forth herein.

FIELD

Embodiments relate generally to managing locked printing requests in cloud printing environments.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Cloud printing services generally enable end users to access printing devices from client devices over a network, such as the Internet. Using a cloud printing service provider, an end user may register one or more printing devices with the cloud printing service provider for one or more user accounts. After registering a printing device, the user may use a client device, such as a laptop or mobile device, to submit print jobs that are sent to the printing device for processing via the cloud printing service provider. By configuring a printing device to process print jobs received from client devices using a cloud printing service, a user's client device need not have installed any particular printer drivers or even be able to communicate directly with the printing device in order to submit print requests.

Since cloud printing services typically push print jobs to printing devices immediately after submission, the delay may be short between an end user submitting a print request and a selected printing device generating a printout of the electronic document in the print job. If the user is not physically present near the printer when the printout is ready, others may gain unauthorized access to the printout.

In non-cloud printing environments, printing devices may be configured with a feature known as "locked printing" to provide control over access to printouts. When the locked printing feature is enabled and a print job is sent to the printing device, processing of the print job is deferred until a user enters authentication data at the printing device and the authentication data is verified. Once the authentication data is successfully verified, the printing device allows the print job to be processed, i.e., allows a printout of the electronic document in the print job to be generated. Although printing devices having locked printing features are useful in non-cloud printing environments, current cloud printing services do not support the ability for users to submit locked print jobs to registered printing devices. Based on the foregoing, there is a need for an approach that provides locked printing features in a cloud printing environment.

SUMMARY

An approach is provided for managing locked print requests in a cloud printing environment. A printing device is configured to receive, from a cloud printing service provider, print job settings for a locked print job. The print job settings data includes data identifying a user and a storage location at the cloud printing service provider of print data associated with the locked print job. The print data, when processed by the printing device, causes generating a printed version of an electronic document represented by the print data. Based at least in part on the print job settings data, an estimated time of expiration of the print data is determined. Based on the estimated time of expiration, it is detected that the print data is near expiration. Detecting that the print data is near expiration may include determining that the estimated time of expiration of the print data is within a specified amount of time of a current time. In response to detecting that the print data is near expiration, an alert is sent to the user indicating that the print data is near expiration.

BRIEF DESCRIPTION OF THE DRAWINGS

In the figures of the accompanying drawings like reference numerals refer to similar elements.

FIG. 5 is a first sequence diagram that depicts an exchange of messages between a client device, a cloud printing service provider, and a printing device in an approach for processing locked printing requests in a cloud printing environment.

DETAILED DESCRIPTION

Figure 1:
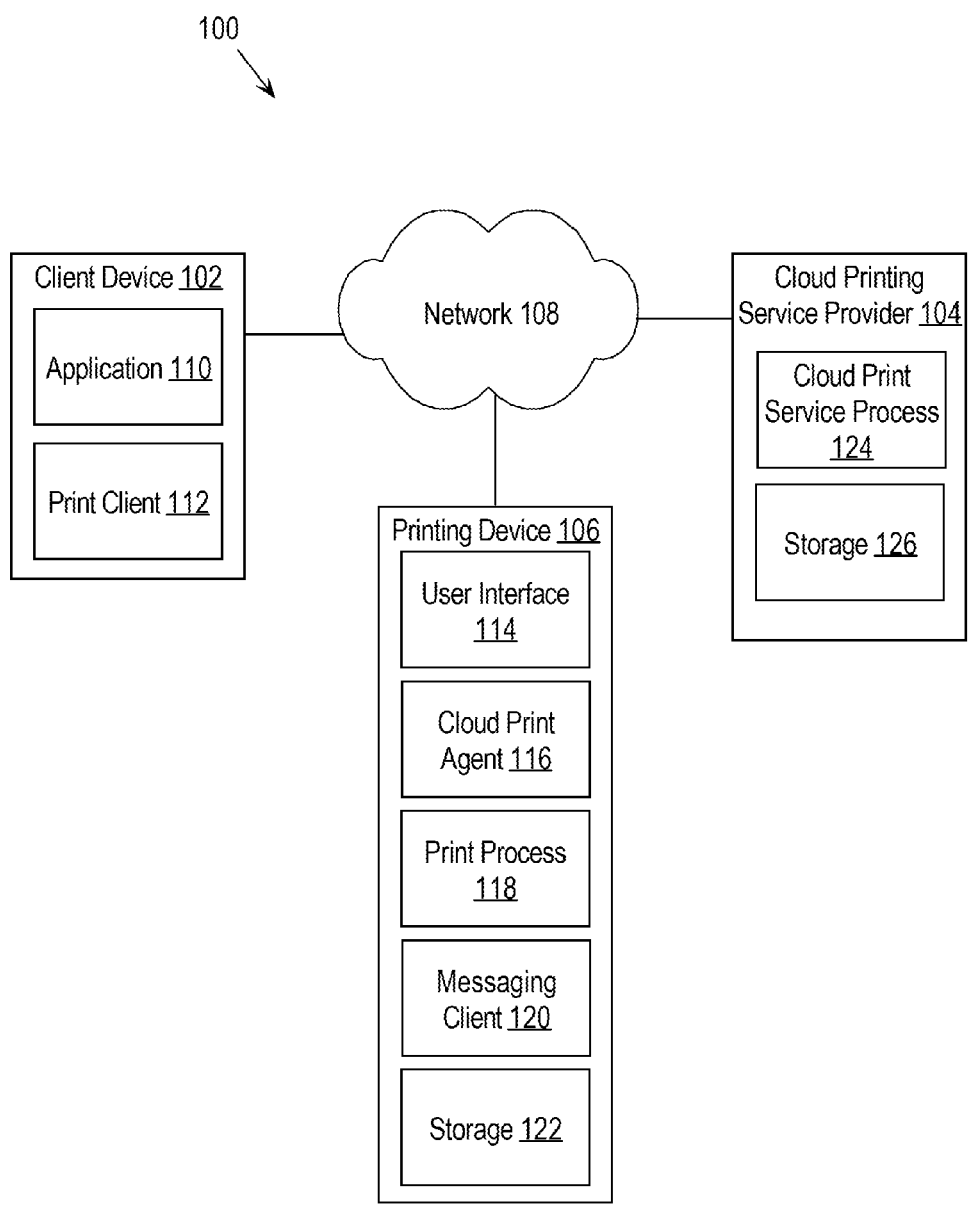
FIG. 1 is a block diagram that depicts an arrangement of a system for processing locked print requests in a cloud printing environment.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
  A. Client Device
  B. Printing Device
  C. Cloud Printing Service Provider
III. RECEIVING A LOCKED PRINT REQUEST IV. NOTIFYING USERS OF PRINT DATA EXPIRATION
V. PROCESSING A LOCKED PRINT REQUEST
VI. EXAMPLE COMMUNICATION EXCHANGES
VII. IMPLEMENTATION MECHANISMS

I. Overview

An approach is provided for managing locked printing requests in cloud printing environments. In a cloud printing environment, a cloud printing service provider provides a platform that enables client devices to send print requests for processing by any printing device that is configured to communicate with the cloud printing service provider over a network, such as the Internet. According to one embodiment, a printing device comprises a cloud print agent that is configured to manage locked printing requests received from client devices via a cloud printing platform. In this context, a locked printing request is a request specifying a print job for which processing of the print job is deferred until a user associated with the print job is authenticated by the printing device.

During the time between a user creating a locked print job at a client device and a destination printing device verifying user authentication data and processing the locked print job, data associated with the print job (e.g., print job settings and print data) may be stored by one or more of the cloud printing service provider and the printing device. However, because it may be undesirable for either the cloud service provider or the printing device to store print job data indefinitely, the cloud printing service provider and/or the printing device may cause stored print job data to become unavailable after a period of time, referred to herein as "expiration" of print job data. An exact time of expiration of print job data generally may be unknown to a user submitting a locked printing request, or the user may initially be aware of an expiration time but later forget. Thus, according to an embodiment, a cloud print agent is configured to notify a user when print data for a print job submitted by the user is near expiration. According to another embodiment, in response to detecting that print data stored by a cloud printing service provider is near expiration, a cloud print agent may perform one or more actions to prolong the availability of the print data. For example, the cloud print agent may retrieve and store the print data on the printing device or on another local storage device in response to detecting that the print data is near expiration. These approaches provide a user-friendly experience for users submitting locked printing requests in cloud printing environments by assisting users to better manage the availability of print data for the print requests.

II. System Architecture

FIG. 1 is a block diagram that depicts an arrangement 100 of a system for locked printing in a cloud printing environment. The arrangement 100 includes a client device 102, a printing device 106, and a cloud printing service provider 104 that are communicatively coupled via a network 108. Network 108 may be implemented using a wide variety of communications links that may vary depending upon a particular implementation. Network 108 may include one or more Local Area Networks (LANs), Wide Area Networks (WANs), packet-switched networks, such as the Internet, terrestrial or satellite links, or other types of wireless links. The elements depicted in FIG. 1 may also have one or more direct communications links with each other.

A. Client Device

Client device 102 generally may be any type of computing device. Examples of a client device 102 include, without limitation, personal computers, laptop computers, tablet computers, personal digital assistants (PDAs), and smart phones. Client device 102 may be configured with computer hardware, computer software, or any combination of computer hardware and computer software to perform the functionality described herein.

The example implementation of a client device 102 in FIG. 1 is configured with an application 110 and a print client 112. Application 110 generally may be any type of application process. Examples of application 110 include, without limitation, a word processor, a spreadsheet program, an email client, a web browser, etc. Application 110 and print client 112 may operate together to provide a platform which enables a user of client device 102 to generate locked print jobs for printing by printing device 106 via a cloud printing platform. In one embodiment, application 110 is configured to display electronic documents (e.g., text documents, web pages, images) and print client 112 is configured to provide a graphical user interface (GUI) for printing electronic documents. Using the GUI provided by print client 112, a user may request locked printing of an electronic document by a particular printing device and may specify other print options for a print job. Print client 112 may be an integrated component of application 110 (i.e., part of the same application process) or may be a separate application process, such as a plug-in, application extension, or driver.

Figure 2A:
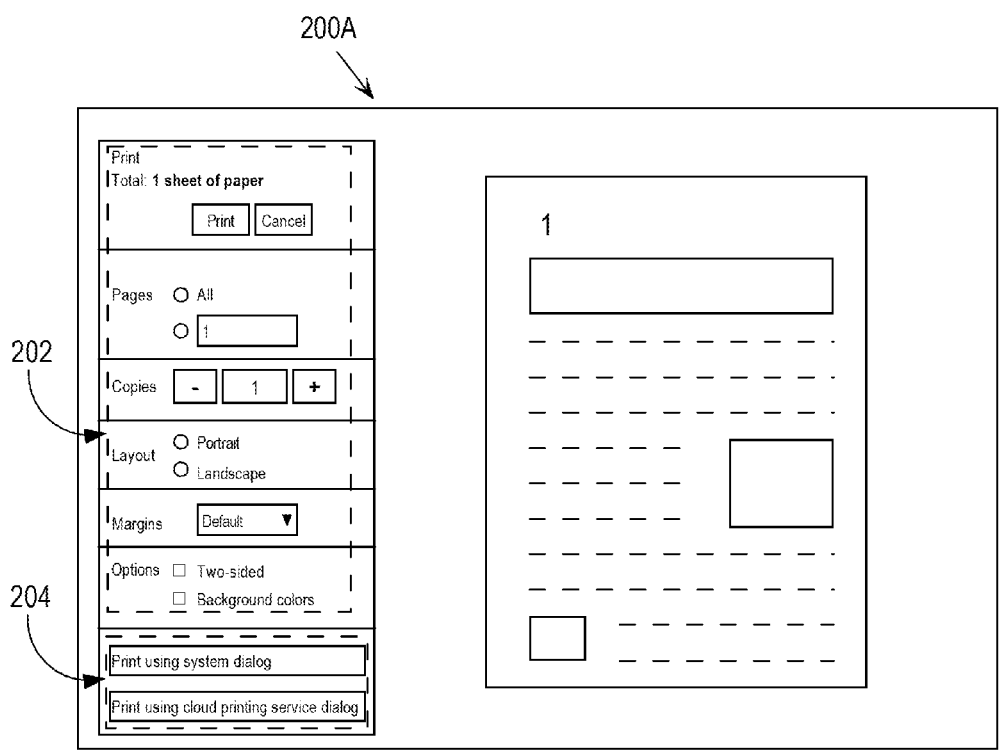
FIG. 2A depicts an example print method selection screen.
Figure 2B:
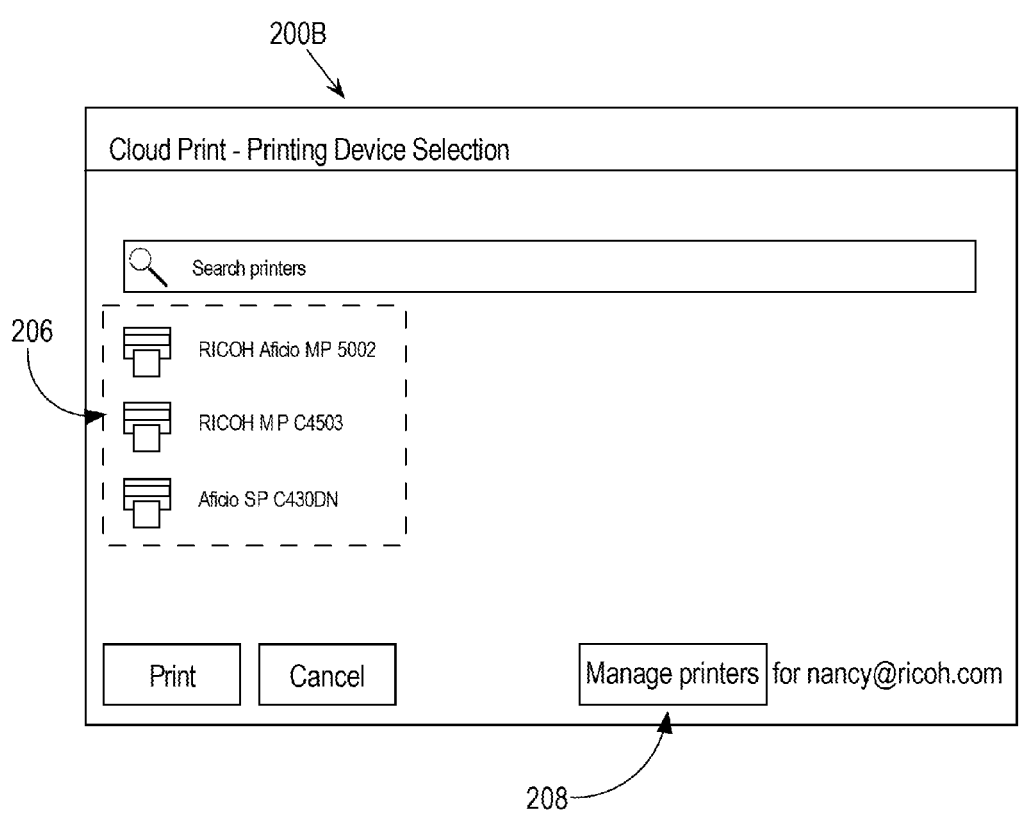
FIG. 2B depicts an example cloud printing device selection screen.
Figure 2C:
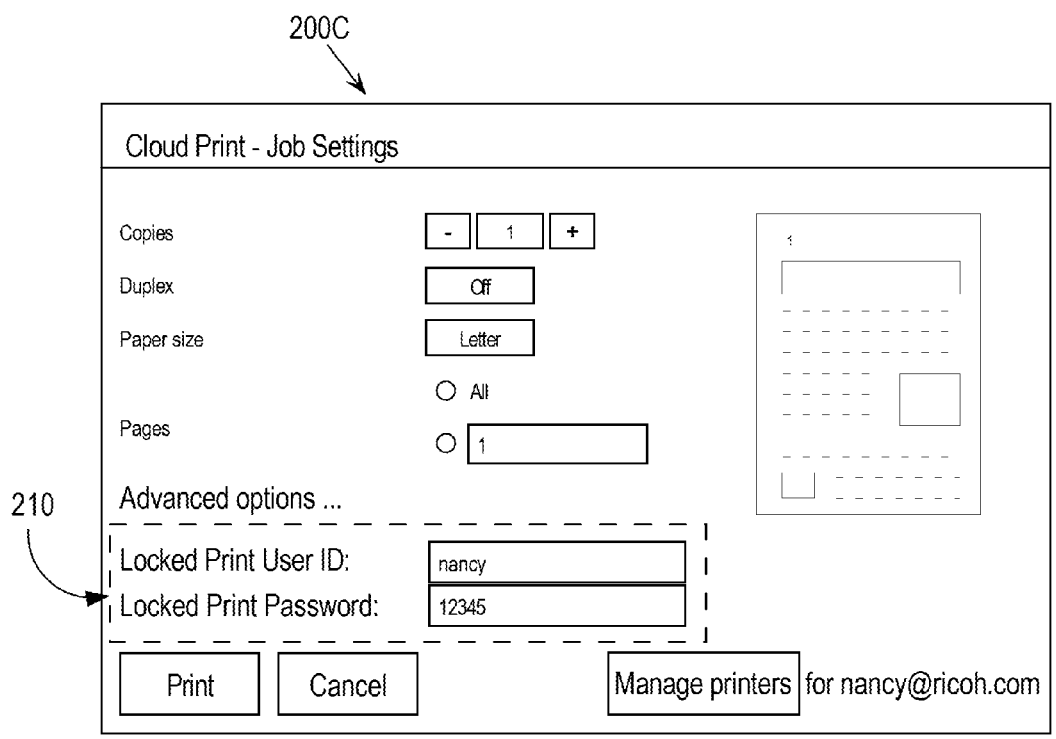
FIG. 2C depicts an example locked print request settings screen.

FIGS. 2A-2C depict example GUIs that enable a user to generate a locked print request at a client device. For example, the example GUIs depicted in FIGS. 2A-2C may be generated by application 110 and/or print client 112 in response to a user requesting to print an electronic document that is displayed by application 110. In FIG. 2A, GUI 200A includes print job settings 202 and print method options 204. Print job settings 202 includes interface elements that allow a user to specify various print job settings such as specific pages of the electronic document to print, a number of copies, a print orientation, etc. Using print job settings 202, a user may specify various preferences that may be included in print settings data that is transmitted as part of a print request.

Print method options 204 include one or more interface elements that allow a user to select a particular print method for printing the electronic document. In this example, a user may select between printing the document using a system dialog, thereby using a print driver installed on client device 102 to submit a print request to a configured printing device, or using a cloud printing service dialog to select a printing device registered with a cloud printing service provider.

FIG. 2B depicts an example cloud printing device selection screen which may be generated in response to a user selecting the cloud printing service dialog option in GUI 200A. In FIG. 2B, GUI 200B includes printing device selection list 206 and cloud printing device management button 208. Printing device selection list 206 lists one or more available destination printing devices for printing the selected electronic document. For example, printing devices displayed in printing device selection list 206 may include printing devices that are registered with the cloud printing service provider. The printing devices registered with the cloud printing service provider may be further configured by selecting the printing device management button 208. Upon selecting printing device management button 208, a user interface screen may be displayed that enables the user to modify settings related to printing devices registered for the user's account or to register new printing devices.

FIG. 2C depicts an example cloud print job settings interface which may be generated in response to a user selecting one or more printing devices in GUI 200B. In FIG. 2C, GUI 200C includes a number of interface elements for configuring additional print job settings, including locked print settings 210. In this example, locked print settings 210 include two text fields that allow a user to supply a user ID and password to be associated with a locked print request. For example, the user ID and password may be transmitted to the selected printing device which may use the user ID and password to authenticate a user at the selected printing device, as described in further detail hereinafter. Although a user ID and password field are depicted in the example of FIG. 2C, any type of authentication data may be specified in locked print settings 210 depending on an implementation. Examples of authentication data that may be specified include, without limitation, passwords, release codes, biometric authentication, and combinations thereof. In one embodiment, locked print settings 210 may represent customized fields that an administrator or other user has configured for display by GUI 200B. For example, the customized fields may be implemented as an extension to an existing cloud printing service platform. In another embodiment, the locked print settings 210 may be implemented as part of the platform provided by the cloud printing service provider.

B. Printing Device

Printing device 106 may be implemented by any type of device that is capable of processing print jobs to generate printed versions of electronic documents represented in the print jobs. Examples of printing device 106 include, without limitation, printers, copiers, and multi-function peripherals (MFPs). The example printing device 106 includes a user interface 114, cloud print agent 116, and print process 118.

User interface 114 may be any type of user interface for enabling a user to interact with printing device 106 and may vary depending upon a particular implementation. Embodiments described herein are not limited to any particular type of user interface 200. Examples of user interface 114 include, without limitation, alphanumeric keys, buttons, touchscreen displays, liquid crystal displays (LCDs), light emitting diode (LED) displays, and any other mechanisms for receiving user input and displaying output to a user.

Cloud print agent 116 may be implemented by one or more processes configured to discover and communicate with cloud printing service provider 104. Cloud print agent may also be configured to generate print data and/or fetch print data for an electronic document. Print process 118 may be implemented by one or more processes for processing print data received from cloud printing service provider 104 and/or generated by cloud print agent 116, and for generating a printed version of an electronic document represented in the print data. As used herein, "print data" refers generally to any data that, when processed by a printing device, causes the printing device to generate a printed version of an electronic document represented in the print data. Examples of print data may include, without limitation, Portable Document Format (PDF) data, PostScript data, page description language (PDL) data, printer command language (PCL) data, and PWG-raster data.

Cloud print agent 116 and print process 118 may be implemented as resident processes on printing device 106. Alternatively, one or more of these services may be made available to printing device 106 on a removable media or may be implemented at a remote location with respect to printing device 106. Cloud print agent 116 and print process 118 may be implemented in hardware, software, or any combination of hardware and software, depending on a particular implementation.

Messaging client 120 generally is configured to enable printing device 106 to send and/or receive messages such as emails, instant messages, SMS text message, or any other type of electronic message. Examples of a messaging client 120 include, without limitation, an email client, an instant messaging client, SMS client, or combinations thereof.

Storage 122 may include any type of volatile or non-volatile storage including, without limitation, random access memory (RAM), one or more disks, or any combination of RAM and one or more disks for storing print job settings data, print data, printing device configuration data, and other type of data depending on a particular implementation.

C. Cloud Printing Service Provider

Cloud printing service provider 104 may be implemented by one or more computing devices and/or services that are capable of communicating with a client device 102 and printing device 106 over network 108. Although cloud printing service provider 104 is depicted as a single block, cloud printing service provider 104 may be distributed across multiple devices that are communicatively coupled via network 108. Cloud printing service provider 104 generally is configured to process print requests received from a client device 102 and to cause printing device 106 to print an electronic document based on the print requests. One example implementation of cloud printing service provider 104 is the Google Cloud Print™ printing service from Google, Inc.; however, embodiments described herein are not limited to Google Cloud Print™ or any other particular cloud printing service provider.

An example implementation of cloud printing service provider 104 includes a cloud print service process 124 and storage 126. Cloud print service process 124 is configured to process print requests received from a client device 102 and to cause printing device 106 to print an electronic document based on the print requests. Storage 212 may include any type of volatile or non-volatile storage including, without limitation, random access memory (RAM), one or more disks, or any combination of RAM and one or more disks. Storage 212 may store data including print job settings data, print data, and user account information, and other data for processing print requests submitted by client device 102.

Cloud printing service provider 104 may also include other components not depicted for purposes of brevity. For example, cloud printing service provider 104 may include an interface that enables one or more printing devices to be registered in association with a user account. Cloud printing service provider 104 may require authentication of client device 102 before allowing access to printing device 106. For instance, a user of client device 102 may be required to provide a username and password to view and access printing devices registered by the user, such as printing device 106, via the cloud printing services.

For the purposes of explanation, one client device 102 and one printing device 106 are shown in FIG. 1, however, cloud printing service provider may be communicatively coupled to any number of client devices and/or printing devices. Thus, cloud printing service provider 104 may process multiple print requests received from different client devices requesting to print to various printing devices. Cloud printing service provider 104 may implement serial and/or parallel processing techniques to process the different print requests. Cloud printing service provider 104 may assign unique job identifiers to each print request to help distinguish between requests and locate data associated with each print request, as described in more detail hereinafter.

III. Receiving a Locked Print Request

Figure 3:
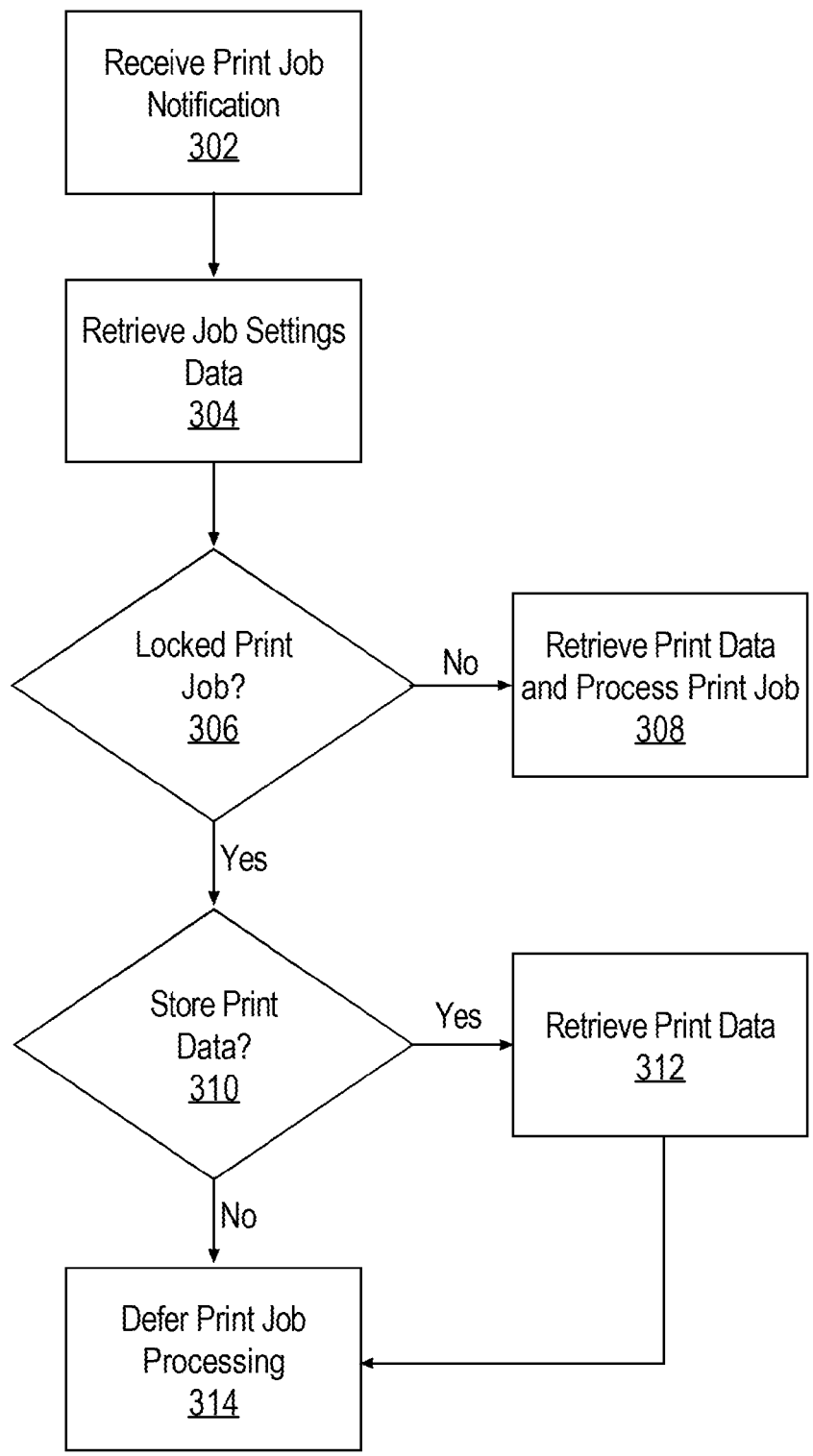
FIG. 3 depicts a flow diagram for receiving a locked print job in a cloud printing environment.

According to embodiments described herein, a printing device provides services for managing locked print requests received from client devices via a cloud service provider. For example, a user of client device 102 may generate a locked print job using one or more user interfaces similar to those depicted in FIGS. 2A-2C. The user generating the locked print job may specify one or more destination printing devices to process the print job. The user's client device sends the locked print job to the cloud service provider which in turn notifies the one or more destination printing devices of the print job. A destination printing device may defer processing of the locked print job until user authentication data is received and verified by the printing device. FIG. 3 depicts a flow diagram for receiving a locked print job at a printing device in a cloud printing environment, according to an embodiment.

In step 302, a print job notification is received. For example, cloud print agent 116 of printing device 106 may receive a print job notification from cloud printing service provider 104. Cloud print service process 124 may send a print job notification to printing device 106 to indicate that cloud print service process 124 has received one or more print jobs specifying printing device 106 as a destination printing device. Print job notifications and other messages exchanged between client device 102, cloud printing service provider 104, and printing device 106 generally may be implemented using any suitable communication protocol depending on a particular implementation.

In one example embodiment, cloud printing service provider 104 communicates with client device 102 and/or printing device 106 using a communication protocol based on Extensible Markup Language (XML). Example XML-based communications protocols include, without limitation, the Extensible Messaging and Presence Protocol (XMPP), the Simple Object Access Protocol (SOAP), and other Web Services Description Languages (WSDLs). In one particular example, printing device 106 may be configured to establish a persistent XMPP connection with cloud printing service provider 104 and the devices may send and receive notifications and other messages using the XMPP connection. In another embodiment, printing device 106 may receive print job notifications by periodically polling cloud printing service provider 104 for new print jobs.

In step 304, in response to receiving the print job notification, job settings data is retrieved. For example, cloud print agent 116 may send a request to cloud print service process 124 to retrieve job settings data for print jobs queued for processing by printing device 106. The request may include a device identifier or other information that identifies printing device 106 so that cloud print service process 124 may select and send to printing device 106 print job settings data for print jobs specifying printing device 106 as a destination printing device. Print job settings data received for a queued print job generally may include any information related to the print job and the user submitting the print job. Examples of print job settings data includes, without limitation, a print job identifier, a print job description, a reference to a storage location of print data associated with the print job, a user identifier, user contact information, and locked print data.

In one embodiment, locked print data generally may comprise any data that indicates to cloud print agent 116 that a printed version of the print job should be locked and not processed until a user is authenticated. For example, a user may specify that a particular print job is a locked print job at a client device 102 by providing a user ID and password using locked print settings 210 GUI 200C depicted in FIG. 2C. As a result, client device 102 and/or cloud printing service provider 104 may create job settings data for the print job that includes the provided user ID and password. The locked print data may include encrypted data so that usernames and/or passwords included in locked print data are not transmitted as plain text. In one particular embodiment, the locked print data may be based on an authentication standard such as the OAuth or OpenID authentication standards. Embodiments described herein generally may use any type of locked print data and are not limited to any particular format for representing locked print data. Cloud print agent 116 may retrieve and store the job settings data for the print job, including any locked print data, in storage 122 for subsequent retrieval.

In step 306, a determination is made whether the print job is a locked print job. For example, cloud print agent 116 may determine whether the print job received from cloud print service provider 104 is a locked print job by detecting that locked print data is included in job settings data for the print job. For example, as described above, locked print data may be included in job settings data for the print job in response to a user providing locked print settings at client device 102 when the user creates the print job.

If, in step 306, a determination is made that the print job is not a locked print job, then in step 308 print data for the print job is retrieved and processed. For example, if cloud print agent 116 determines that the print job is not a locked print job, e.g., if cloud print agent 116 does not detect any locked print data, cloud print agent 116 may retrieve print data for the print job and send the print job data to print process 118 for processing, i.e., to generate a printout. Generation of a printout by print process 118 is described in more detail hereinafter in reference to FIG. 4B.

If, in step 306, a determination is made that the print job is a locked print job, then in step 310, a determination is made whether the print data is to be stored. For example, if in step 306, cloud print agent 116 determines that the print job is a locked print job, then in step 310, cloud print agent 116 may determine whether to store print data for the print job at printing device 106. Because processing of the locked print job is deferred by printing device 106 until user authentication is completed, cloud print agent 116 may also defer retrieving the print data for the print job from cloud printing service provider 104. By deferring retrieval of the print data, printing device 106 may store only the relatively small print job settings data until such time that the user is ready to retrieve the printout, thereby reducing the storage requirements of printing device 106. In an embodiment, the option for printing device 106 to defer retrieval of the print data for locked print jobs may be configurable by an administrator of printing device 106 or the option may be configurable by a user for each print job.

If, in step 310 a determination is made that the print data is to be stored, then in step 312 the print data is retrieved. For example, if cloud print agent 116 determines in step 310 that the print data is to be stored, then cloud print agent 116 retrieves the print data from cloud printing service provider 104. The print data may be retrieved from cloud printing service provider 104 by requesting the print data from a URL or other location identifier specified in the job settings information for the print job. Cloud print agent 116 may store the retrieved print data in storage 126.

In step 314, print job processing is deferred. For example, whether or not cloud print agent 116 stores the print data on printing device 106, cloud print agent 116 defers processing of the print job until the user submitting the print job provides authentication data at printing device 106 and the authentication data is verified. Deferring the print job may include associating the print job with a queue of locked print jobs that are pending user authentication at printing device 106.

IV. Notifying Users of Print Data Expiration

Figure 4A:
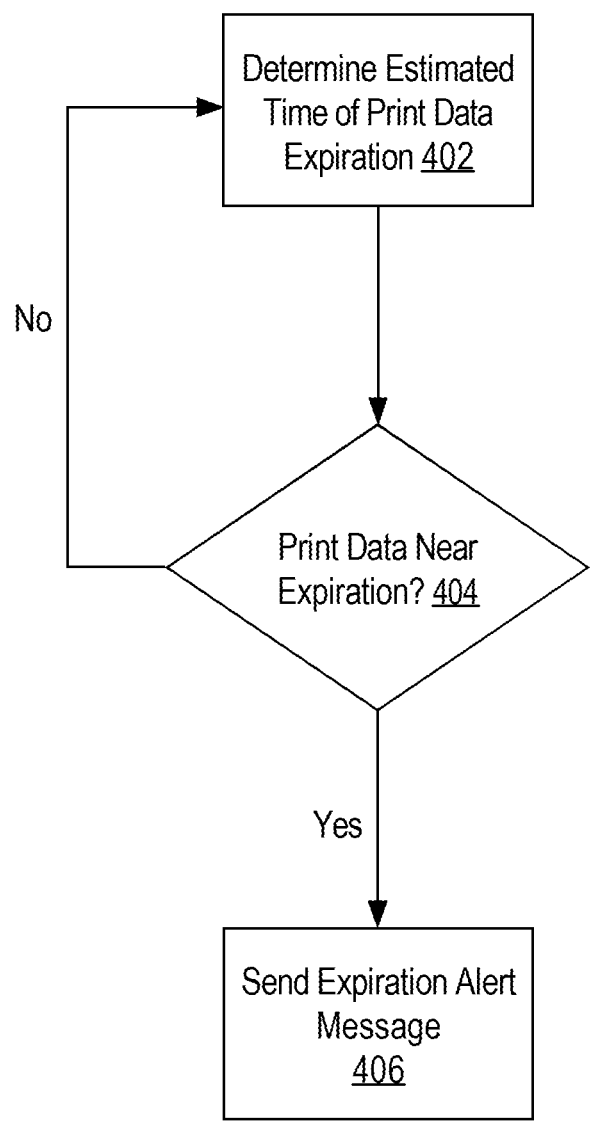
FIG. 4A depicts a flow diagram for notifying a user of the approaching expiration of print data.

In one embodiment, in response to a printing device receiving a locked print job from a cloud service provider, print data for the print job may be stored by one or more of the cloud printing service provider and the printing device until such time that the user is authenticated by the printing device. However, the cloud printing service provider and/or the printing device typically may be configured to store print data for only a limited amount of time so that locked print jobs that are never completed, e.g., print jobs for which a user associated with the print job is never authenticated at printing device, do not take up storage space. According to an embodiment, a printing device is configured to alert a user of the approaching expiration of print data for a print job submitted by the user. FIG. 4A depicts a flow diagram for notifying a user of the approaching expiration of print data for a locked print job.

In step 402, an estimated time of expiration of print data for the print job is determined. For example, cloud print agent 116 may determine an estimated time of expiration of print data associated with a print job received by printing device 106. Determining an estimated time of expiration of print data may depend on which device(s) the print data is stored. For example, if cloud print agent 116 is configured to defer the retrieval of print data for locked print requests, as described above in reference to step 310 of FIG. 3, determining an estimated time of expiration may include determining an approximate time at which the print data is no longer available for retrieval from cloud printing service provider 104. In one embodiment, cloud printing service provider 104 may specify an estimated time of expiration as part of the print job settings data sent to printing device 106. In another embodiment, a length of time for which cloud printing service provider 104 stores print data may be provided in documentation or other information associated with the service. Cloud print agent 116 may use the documented storage time of cloud printing service provider 104 to calculate an estimated time of expiration. For example, if cloud printing service provider 104 indicates in documentation that the service stores print data for approximately 24 hours after receiving a print request, cloud print agent 116 may calculate an estimated expiration time that is 24 hours from the time printing device 106 receives the print job notification.

Similarly, if cloud print agent 116 is configured to retrieve and store print data at printing device 106 at the time a print job notification is received, determining an estimated time of expiration may include determining an approximate time at which the print data is no longer accessible on printing device 106. A length of time for which printing device 106 stores print data for locked print jobs may be specified in a configurable or non-configurable expiration setting that is stored by printing device 106. Cloud print agent 116 may similarly use the stored expiration setting to calculate an estimated expiration time based on determining a time when cloud print agent 116 receives a print notification for a print job and stores the print data for the print job. In an embodiment, cloud print agent 116 may store an estimated expiration time for a particular print job as part of the print settings data for the print job, as separate data in storage 122, or in any other format.

In one embodiment, a length of time for which print data is stored by cloud printing service provider 104 and/or printing device 106 may be configurable by an administrator or other user of printing device 106. For example, cloud printing service provider 104 may provide an interface that enables an administrator or other user to configure various settings for print jobs submitted to cloud printing service provider 104 such as the length of time to store print data and an amount of storage space available to the user. Similarly, printing device 106 may provide one or more configuration screens via user interface 114 that allow a user to configure a length of time for which printing device 106 stores print data for received locked print jobs.

In step 404, a determination is made whether print data for the print job is near expiration. For example, cloud print agent 116 may monitor whether the print data associated with the print job received from cloud printing service provide 104 is near expiration. Cloud print agent 116 monitoring whether the print data is near expiration may include comparing a current time against the estimated time of expiration for the print data calculated in step 402. Printing device 106 may determine that the print data is near expiration by detecting that the estimated time of expiration is within a specified amount of time of the current time. The specified amount of time may represent a configurable threshold at which it is determined that a user is to be alerted of the approaching expiration of the print data. For example, the specified time may be two hours, one day, or any other suitable amount of time for users to complete processing of a locked print job after receiving and alert, if so desired and able. The specified amount of time for determining whether print data is near expiration may be configurable by an administrator or other user as a stored setting of printing device 106, or the specified amount of time may be specified by a user creating a print job and included in the print job settings data. If, in step 404, it is determined that the print data is not near expiration, then the printing device may continue to monitor for approaching expiration of the print data in steps 402, 404.

If, in step 404, a determination is made that print data for the print job is near expiration, then in step 406, an expiration alert message may be sent to the user creating the print job. For example, cloud print agent 116 may generate a message with information alerting the user of the approaching expiration of the print data so that the user may take appropriate action. For example, the user may have created and the print job at client device 102 and not yet made time to retrieve the printout or forgotten of its existence entirely. The alert message may remind the user that the print job was created and provide the user with an approximate amount of time the print job remains available for processing by printing device 106. The approximate amount of time the print job remains available may be calculated based on a current time and the estimated time of expiration calculated in step 402.

In an embodiment, cloud print agent 116 may send one or more alert messages to the user using messaging client 120. Examples of types of messages that may be sent to alert a user of the approaching expiration of print data may include, without limitation, emails, instant messages, and text messages. Cloud print agent 116 may determine one or more recipient addresses for an alert message based on contact information stored in print settings data for the print job, or based on contact information stored by printing device 106 and/or cloud printing service provider 104 in association with a user identifier. In one embodiment, cloud print agent 116 may cause an expiration alert message to be sent to the user by sending a command to cloud printing service provider 104 that instructs cloud printing service provider 104 to send the alert message on behalf of printing device 106.

V. Processing a Locked Print Request

Figure 4B:
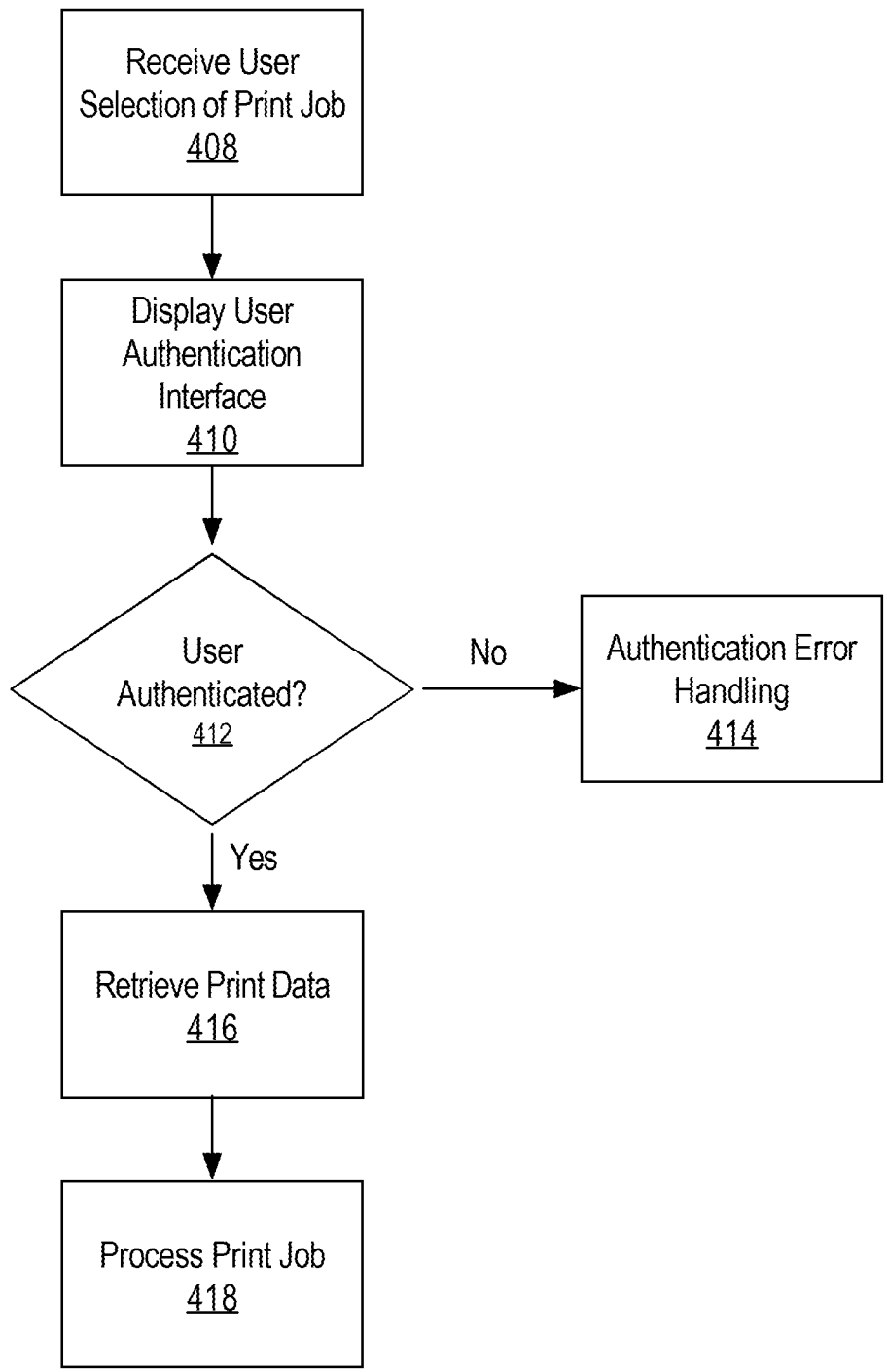
FIG. 4B depicts a flow diagram for processing a locked print job.

According to an embodiment, a printing device receives user input selecting a locked print job and processes the locked print job in response to authenticating a user associated with the locked print job. FIG. 4B depicts a flow diagram for processing a locked print job received from a cloud printing service provider.

In step 408, a printing device receives user selection of a locked print job for processing. For example, a user may use an operation panel of printing device 106 to select a particular locked print job from a list of print jobs queued for processing by printing device 106. A display screen of the operation panel may present a list of queued print jobs and include for each print job a print job identifier, print job description, or other information that may assist a user in selecting a particular locked print job for further processing.

In step 410, a printing device displays a user authentication interface for a locked print job. For example, cloud print agent 116 may cause user interface 114 to display a user authentication interface that prompts a user for a user ID and password. Cloud print agent 116 may display the user authentication prompt on an operation panel display screen of printing device 106. The user authentication prompt may be displayed on user interface 114 in response to cloud print agent 116 receiving notification of a locked print job from cloud printing service provider 104, in response to a user selecting the print job from a list of locked print jobs queued on printing device 106, or at any other time.

In step 412, a determination is made whether a user associated with the print job is authenticated. For example, cloud print agent 116 may determine whether user authentication data for the print job has been verified. Cloud print agent 116 may receive a user ID and password, release code, or other authentication data for the print job provided by a user at the user authentication prompt displayed in step 410. Cloud print agent 116 may verify the user authentication data by comparing the provided authentication data against authentication data stored in the print job settings data for the print job. In another embodiment, printing device 106 may send provided authentication data to cloud printing service provider 104 and cloud printing service provider 104 may determine whether the user provided authentication data matches authentication data provided by the user at client device 102 at the time the print job was created.

If, in step 412, a user associated with the print job is authenticated, then the printing device may proceed with processing of the print job. In step 416, print data for the print job is retrieved. In one embodiment, retrieving image data for the print job may include determining whether print data for the print job is stored on the printing device or at the cloud service provider. For example, print data may be stored at the cloud service provider, but not at the printing device, if retrieval of the print data for the print job was deferred by the printing device until user authentication, as described above in reference to step 310 of FIG. 3. If it is determined that the print data is stored on the printing device, then the print data may be retrieved from printing device storage. For example, cloud print agent 116 may retrieve the print data from storage 122. If it is determined that the print data is not currently stored on the printing device, then the print data may be retrieved from the cloud printing service provider. For example, cloud print agent 116 may retrieve the print data from cloud printing service provider 104 based on a URL or other information specified in the job settings data that identifies a storage location of the print data.

In response to retrieving the print data in step 416, in step 418, the printing device processes the print job. For example, printing device 106 may process the print job which may include cloud print agent 116 transforming electronic document data for the print job into PDL data or PCL data. In another embodiment, cloud print agent 116 performs rasterization on the electronic document data, the PDL data, or the PCL data to generate a raster image of the electronic document. In yet another embodiment, cloud print agent 116 generates print data based on the print option data. For example, cloud print agent 116 may convert the print settings data for the print job into a format that may be processed by print process 118.

The print process 118 processes the print data and generates a printout of the electronic document represented in the print data. Print process 118 may implement any suitable mechanism for transforming the print data into a physical printout. In one embodiment, print process 118 comprises a raster image processor that rasterizes PDL data or PCL data generated by cloud print agent 116. In another embodiment, non-rasterized printing may be implemented or the rasterization may be performed by cloud print agent 116. Print process 118 may further applies print settings represented in the print settings data. For example, print process 118 may print multiple copies of the electronic document, print to a certain tray, or perform duplex printing based on the print settings data for the print job.

The steps depicted in FIG. 3, FIG. 4A, and FIG. 4B are meant for purposes of explanation and should not be limited to any particular order. In addition, one or more steps depicted in FIG. 3, FIG. 4A, and FIG. 4B may be omitted, depending on the particular implementation. Therefore, the processes of FIG. 3, FIG. 4A, and FIG. 4B are to be regarded in an illustrative rather than a restrictive sense.

V. Example Communication Exchanges

Figure 6:
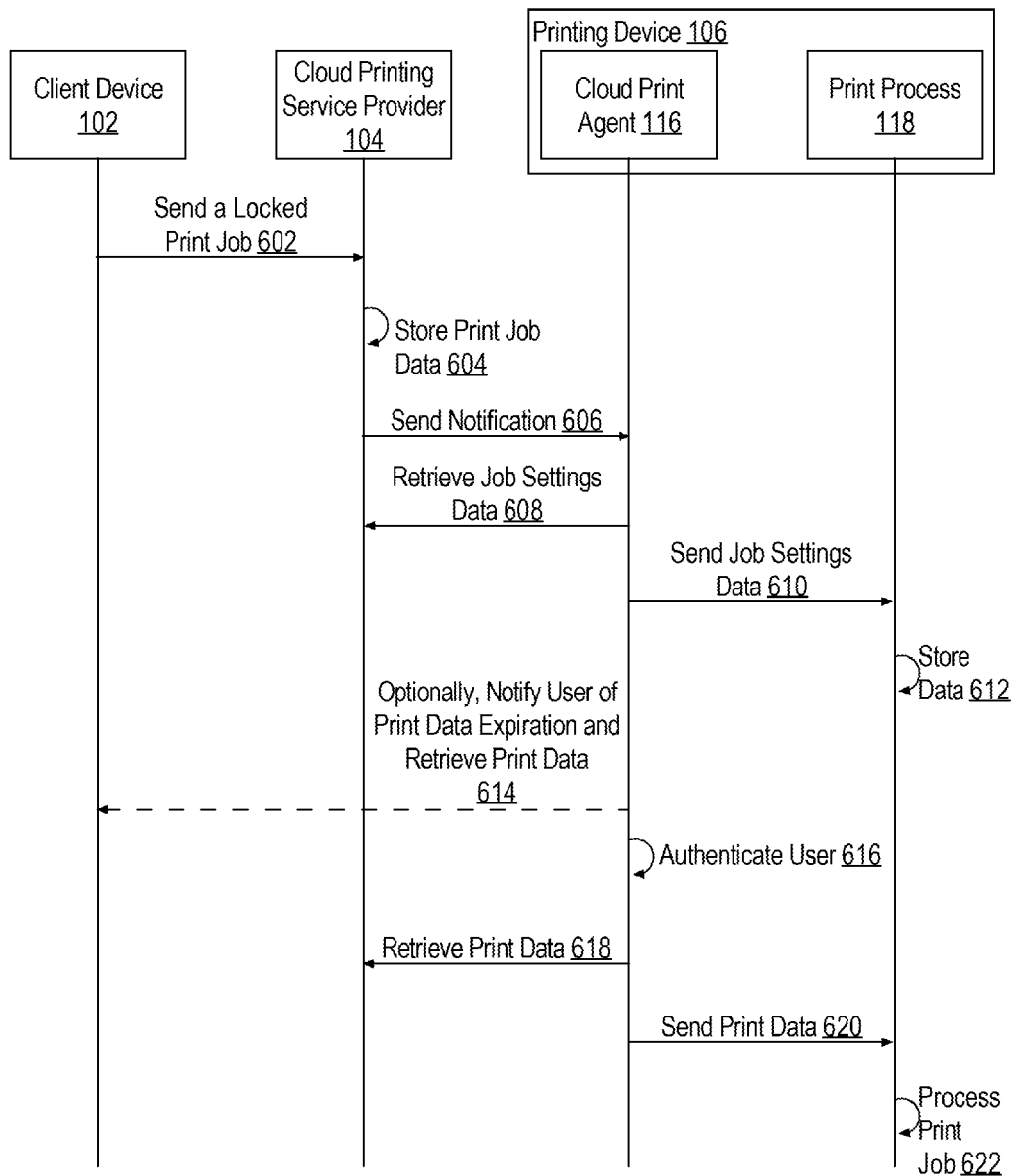
FIG. 6 is a second sequence diagram that depicts an exchange of messages between a client device, a cloud printing service provider, and a printing device in an approach for processing locked printing requests in a cloud printing environment.

FIG. 5 and FIG. 6 are example sequence diagrams that depict an exchange of messages between a client device 102, cloud printing service provider 104, and printing device 106 in an approach for processing locked printing requests in a cloud printing environment. In both the example sequences of FIG. 5 and FIG. 6, printing device 106 receives a locked printing job generated by client device 102 via cloud printing service provider 104. In the example depicted in FIG. 5, in response to receiving a print job notification from cloud printing service provider 104, printing device 106 retrieves both job settings data and print data for the print job from cloud printing service provider 104 and stores the retrieved data until the user submitting the print job is authenticated at printing device 106 or the print data expires. In the example depicted in FIG. 6, in response to receiving a print job notification from cloud printing service provider 104, printing device 106 retrieves the job settings data for a received print job, but defers retrieval of print data for the print job until the user submitted the print job is authenticated at printing device 106.

Referring to FIG. 5, in step 502, client device 102 sends a locked print job to cloud printing service provider 104. For example, the print job may be created by a user of client device 102 as described above and the user may specify printing device 106 as the destination printing device for the print job. The user may further specify that the print job is a locked print job by providing a user ID and password or any other type of authentication data for the print job.

In step 504, cloud printing service provider 104 stores print job data for the print job including print job settings data and print data. In one embodiment, cloud printing service provider 104 may generate the print data from an electronic document received from client device 102. For example, cloud printing service provider 104 may receive the electronic document and convert the electronic document to a portable document format (PDF). In another example, cloud printing service provider 104 may convert the electronic document to page description language (PDL) data, printer command language (PCL) data, other non-rasterized print data or rasterized print data. The electronic document may be transmitted from client device 102 to cloud printing service provider 104 by the user as part of the user generating the print job request or as a separate process. In another embodiment, the conversion of the electronic document to print data may be implemented by client device 102 or printing device 106. In step 506, cloud printing service provider 104 sends a print job notification to printing device 106 notifying printing device 106 that the print job data is available for retrieval at cloud printing service provider 104.

In step 508, in response to receiving the print job notification, cloud print agent 116 of printing device 106 retrieves job settings data for one or more print jobs queued for processing by printing device 106 at cloud printing service provider 104, including the print job submitted by client device 102 in step 502. In step 510, cloud print agent 116 also retrieves print data for the print job. For example, cloud print agent 116 may retrieve the print data using a URL specified in the job settings data and indicating a storage location of the print data, or using any other mechanism to retrieve the print data.

In step 512, cloud print agent 116 sends the retrieved job settings data and the print data to print process 118. In step 514, print process 118 stores the print job data, for example, in storage 122. In one embodiment, print process 118 may store the print job data on a storage device that is separate from printing device 106 and on a same local network as printing device 106, for example, a network-attached storage (NAS) device.

In step 516, cloud print agent 116 may send an expiration alert message to client device 102, or any other device, if cloud print agent 116 determines that the print data stored in step 514 is near expiration. Cloud print agent 116 determining whether the stored print data is near expiration and sending an expiration alert message may be performed in a manner similar to that described above in reference to steps 404 and 406 in FIG. 4A.

In step 518, cloud print agent 116 receives and verifies authentication data for the user submitting the print request at printing device 106. For example, the user may provide the authentication to cloud print agent by inputting the data using an operation panel of printing device 106. In step 520, cloud print agent 116 sends a notification to print process 118 indicating that the user authentication data has been verified and that print process 118 may proceed with processing the print job. In step 522, print process 118 processes the print job. For example, as described above, print process 118 processing the print job may include the print process generating a printout of the electronic document represented in the print data.

FIG. 6 depicts a communication exchange sequence similar to the process depicted in FIG. 5, except that in response to printing device 106 receiving a print job notification, printing device 106 defers retrieval of print data for the print job until user authentication data for a user creating the print job is received and verified by printing device 106.

In step 602, client device 102 sends a locked print job to cloud printing service provider 104. In steps 604 and 606, cloud printing service provider 104 stores print job data for the submitted print job and sends a notification to printing device 106.

In step 608, in response to receiving the print job notification, cloud print agent 116 retrieves job settings data, but does not yet retrieve the print data for the print job. In step 610, cloud print agent 116 sends the job settings data to print process 118 and, in step 612, print process 118 stores the job settings data.

In step 614, cloud print agent 116 optionally notifies the user submitting the print job that the print data for the print job is near expiration. In the example of FIG. 6, cloud print agent 116 may notify the user that the print data is near expiration based on an estimated expiration time of the print data at cloud printing service provider 104 since cloud print agent 116 has deferred retrieving the print data from cloud printing service provider 104. In one embodiment, cloud print agent 116 may optionally retrieve and store the print data from cloud printing service provider 104 in response to detecting that the print data is near expiration in order to prolong the user's ability to access the print data at printing device 106.

In step 616, cloud print agent 116 authenticates the user submitting the print request at printing device 106. In response to authenticating the user, in step 618, cloud print agent 116 retrieves the print data from cloud printing service provider 104 and, in step 620, sends the print data to print process 118 for processing. In step 622, print process 118 processes the print job and generates a printout.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
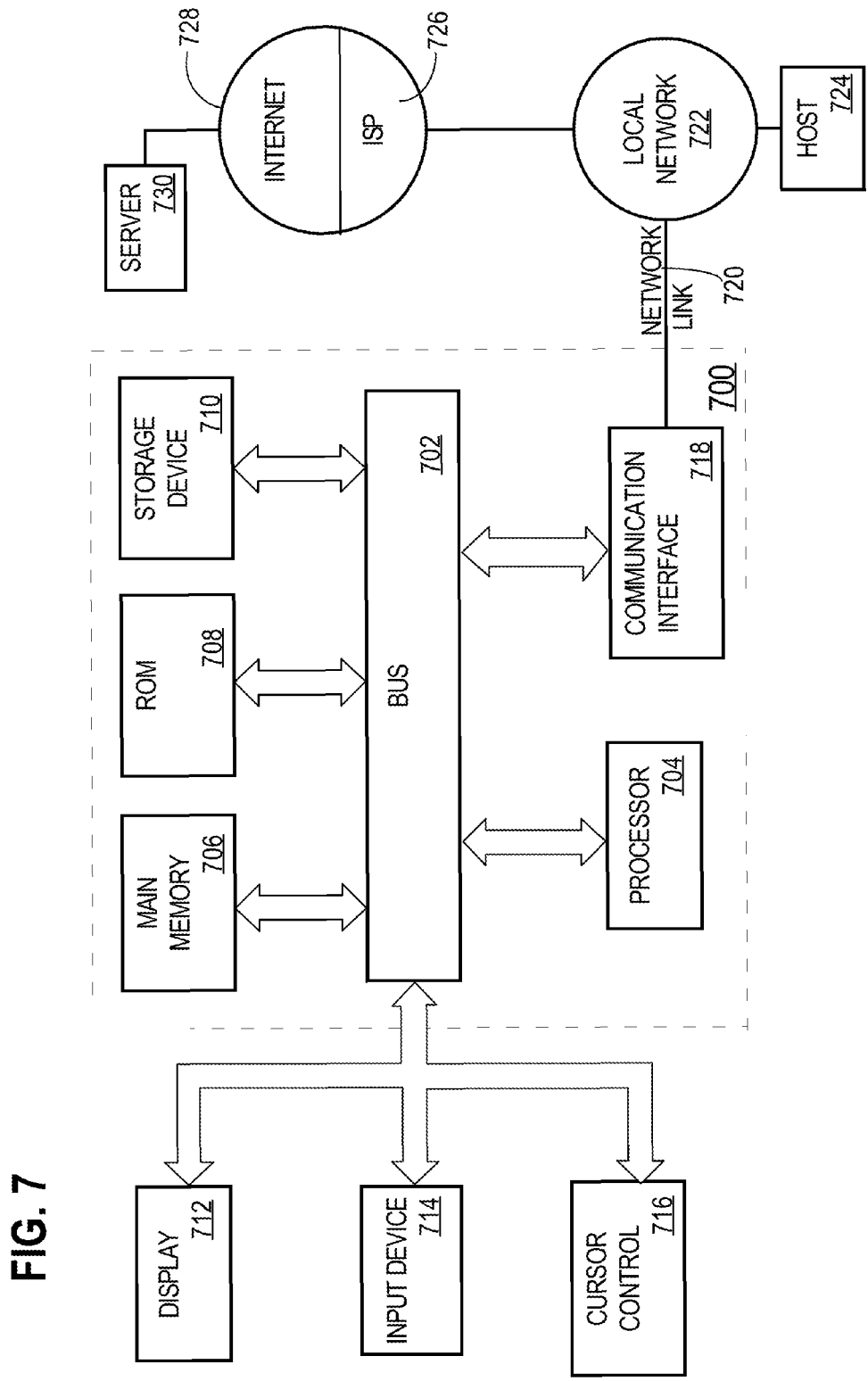
FIG. 7 is a block diagram that depicts an example computer system upon which an embodiment may be implemented.

FIG. 7 is a block diagram that depicts an example computer system 700 upon which embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. Although bus 702 is depicted as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   one or more processors; and
   one or more memories storing instructions which, when processed by the one or more processors, cause:

retrieving, by the printing device, over one or more networks from a cloud printing service provider, print job settings data for a locked print job, wherein the print job settings data includes data identifying a storage location at the cloud printing service provider where print data associated with the locked print job is stored until requested by the printing device, wherein the print data, when processed by the printing device, causes generating a printed version of an electronic document represented in the print data, wherein the print job settings data for the locked print job is received separate from the print data;

retrieving, by the printing device, based upon the print job settings data for the locked print job, the print data from the cloud printing service provider over the one or more networks;

determining, at the printing device, based at least in part on the print job settings data for the locked print job received over the one or more networks from the cloud printing service provider, that the print job is a locked print job with respect to the printing device;

in response to determining, at the printing device, based at least in part on the print job settings data for the locked print job received over the one or more networks from the cloud printing service provider, that the print job is a locked print job with respect to the printing device, instead of printing the print data, storing the print data at the printing device until an authenticated user requests printing or the print data expires.

2. The printing device of claim 1, wherein the one or more memories store additional instructions which, when processed by the one or more processors, cause:

receiving user input authenticating the user at the printing device;

in response to receiving the user input authenticating the user at the printing device, allowing the locked print job to be processed on the printing device.

3. The printing device of claim 1, wherein the one or more memories store additional instructions which, when processed by the one or more processors, cause:

receiving user input specifying a length of time to store the print data; and sending a command to the cloud printing service provider, wherein the command causes the cloud printing service provider to store the print data for the specified length of time.

4. The printing device of claim 1, wherein the one or more memories store additional instructions which, when processed by the one or more processors, cause:

receiving user input specifying a length of time to store the print data on the printing device; and configuring the printing device to store the print data for the specified length of time.

5. The printing device of claim 1, wherein the one or more memories store additional instructions which, when processed by the one or more processors, cause:

determining, at the printing device, based at least in part on the print job settings data for the locked print job received over the one or more networks from the cloud printing service provider, an estimated time of expiration of the print data;

detecting, at the printing device, based on the estimated time of expiration determined, at the printing device, based at least in part on the print job settings data for the locked print job received over the one or more networks from the cloud printing service provider, that the print data is near expiration by determining that the estimated time of expiration of the print data is within a specified amount of time of a current time;

in response to detecting, at the printing device, that the print data is near expiration, the printing device:
sending, to the user, an alert indicating that the print data is near expiration, and
retrieving the print data over the one or more networks from the cloud printing service provider and storing the print data on the printing device.

6. The printing device of claim 5, wherein the one or more memories store additional instructions which, when processed by the one or more processors, cause:

in response to detecting, at the printing device, that the print data is near expiration, storing the print data on a server that is on a same local network as the printing device.

7. The printing device of claim 5, wherein the alert includes one or more of an email, an instant message, or a text message.

8. A printing device comprising:
one or more processors;
one or more memories storing instructions which, when processed by the one or more processors, cause:
retrieving, by the printing device, over one or more networks from a cloud printing service provider, print job settings data for a locked print job, wherein the print job settings data includes data identifying a storage location at the cloud printing service provider where print data associated with the locked print job is stored until requested by the printing device, wherein the print data, when processed by the printing device, causes generating a printed version of an electronic document represented in the print data, wherein the print job settings data for the locked print job is received separate from the print data;

determining, at the printing device, based at least in part on the print job settings data for the locked print job received over the one or more networks from the cloud printing service provider, that the print job is a locked print job with respect to the printing device;

determining whether a user has been authenticated at the printing device; and in response to detecting that the user has been authenticated at the printing device, the printing device:
retrieving the print data over the one or more networks from the cloud printing service provider and storing the print data on the printing device, and
in response to determining, at the printing device, based at least in part on the print job settings data for the locked print job received over the one or more networks from the cloud printing service provider, that the print job is a locked print job with respect to the printing device, instead of printing the print data, storing the print data at the printing device until the authenticated user requests printing of the locked print job or the print data expires.

9. The printing device of claim 8, wherein the one or more memories store additional instructions which, when processed by the one or more processors, cause:

receiving user input authenticating the user at the printing device;

in response to receiving the user input authenticating the user at the printing device, allowing the locked print job to be processed on the printing device.

10. The printing device of claim 8, wherein the one or more memories store additional instructions which, when processed by the one or more processors, cause:
   receiving user input specifying a length of time to store the print data; and
   sending a command to the cloud printing service provider, wherein the command causes the cloud printing service provider to store the print data for the specified length of time.

11. The printing device of claim 8, wherein the one or more memories store additional instructions which, when processed by the one or more processors, cause:
   receiving user input specifying a length of time to store the print data on the printing device; and
   configuring the printing device to store the print data for the specified length of time.

12. The printing device of claim 8, wherein the one or more memories store additional instructions which, when processed by the one or more processors, cause:
   determining, at the printing device, based at least in part on the print job settings data for the locked print job received over the one or more networks from the cloud printing service provider, an estimated time of expiration of the print data;
   detecting, at the printing device, based on the estimated time of expiration determined, at the printing device, based at least in part on the print job settings data for the locked print job received over the one or more networks from the cloud printing service provider, that the print data is near expiration by determining that the estimated time of expiration of the print data is within a specified amount of time of a current time;
   in response to detecting, at the printing device, that the print data is near expiration, the printing device:
      sending, to the user, an alert indicating that the print data is near expiration, and
      retrieving the print data over the one or more networks from the cloud printing service provider and storing the print data on the printing device.

13. The printing device of claim 11, wherein the one or more memories store additional instructions which, when processed by the one or more processors, cause:
   in response to detecting, at the printing device, that the print data is near expiration, storing the print data on a server that is on a same local network as the printing device.

14. The printing device of claim 11, wherein the alert includes one or more of an email, an instant message, or a text message.

15. One or more non-transitory computer-readable media storing instructions which, when processed by the one or more processors, cause:
   retrieving, by the printing device, over one or more networks from a cloud printing service provider, print job settings data for a locked print job, wherein the print job settings data includes data identifying a storage location at the cloud printing service provider where print data associated with the locked print job is stored until requested by the printing device, wherein the print data, when processed by the printing device, causes generating a printed version of an electronic document represented in the print data, wherein the print job settings data for the locked print job is received separate from the print data;
   retrieving, by the printing device, based upon the print job settings data for the locked print job, the print data from the cloud printing service provider over the one or more networks;
   determining, at the printing device, based at least in part on the print job settings data for the locked print job received over the one or more networks from the cloud printing service provider, that the print job is a locked print job with respect to the printing device;
   in response to determining, at the printing device, based at least in part on the print job settings data for the locked print job received over the one or more networks from the cloud printing service provider, that the print job is a locked print job with respect to the printing device, instead of printing the print data, storing the print data at the printing device until an authenticated user requests printing or the print data expires.

16. The one or more non-transitory computer-readable media of claim 15, wherein the one or more memories store additional instructions which, when processed by the one or more processors, cause:
   receiving user input authenticating the user at the printing device;
   in response to receiving the user input authenticating the user at the printing device, allowing the locked print job to be processed on the printing device.

17. The one or more non-transitory computer-readable media of claim 15, wherein the one or more memories store additional instructions which, when processed by the one or more processors, cause:
   receiving user input specifying a length of time to store the print data; and
   in response to receiving the user input, performing one or more of:
      sending a command to the cloud printing service provider, wherein the command causes the cloud printing service provider to store the print data for the specified length of time, or
      configuring the printing device to store the print data for the specified length of time.

18. The one or more non-transitory computer-readable media of claim 15, wherein the one or more memories store additional instructions which, when processed by the one or more processors, cause:
   determining, at the printing device, based at least in part on the print job settings data for the locked print job received over the one or more networks from the cloud printing service provider, an estimated time of expiration of the print data;
   detecting, at the printing device, based on the estimated time of expiration determined, at the printing device, based at least in part on the print job settings data for the locked print job received over the one or more networks from the cloud printing service provider, that the print data is near expiration by determining that the estimated time of expiration of the print data is within a specified amount of time of a current time;
   in response to detecting, at the printing device, that the print data is near expiration, the printing device:
      sending, to the user, an alert indicating that the print data is near expiration, and
      retrieving the print data over the one or more networks from the cloud printing service provider and storing the print data on the printing device.

19. The one or more non-transitory computer-readable media of claim 18, wherein the one or more memories store additional instructions which, when processed by the one or more processors, cause:
    in response to detecting, at the printing device, that the print data is near expiration, storing the print data on a server that is on a same local network as the printing device.

20. The one or more non-transitory computer-readable media of claim 18, wherein the alert includes one or more of an email, an instant message, or a text message.

\* \* \* \* \*